(12) United States Patent
Nakamura et al.

(10) Patent No.: US 6,206,633 B1
(45) Date of Patent: Mar. 27, 2001

(54) CASE ASSEMBLING STRUCTURE OF BLOWER UNIT

(75) Inventors: Takeshi Nakamura, Anjo; Tatsuo Tsunooka; Hiroshi Kanda, both of Kariya; Nobuyasu Naito, Iwakura, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/338,621

(22) Filed: Jun. 23, 1999

(30) Foreign Application Priority Data

Jul. 8, 1998 (JP) .................................. 10-192617

(51) Int. Cl.[7] ...................................... B60H 1/32
(52) U.S. Cl. ...................... 415/151; 415/206; 415/212.1; 415/214.1; 29/428; 29/890.035; 454/139; 264/328.1
(58) Field of Search .................................. 415/151, 200, 415/203, 204, 206, 208.1, 211.1, 212.1, 214.1, 915; 29/890.035, 428; 454/139; 264/299, 318, 328.1

(56) References Cited

U.S. PATENT DOCUMENTS 6,044,656 * 4/2000 Shirota et al. .......................... 62/244

FOREIGN PATENT DOCUMENTS 62-225413 * 10/1987 (JP) ..................................... 454/139

* cited by examiner

Primary Examiner—Edward K. Look
Assistant Examiner—Liam McDowell
(74) Attorney, Agent, or Firm—Harness, Dickey & Pierce, PLC

(57) ABSTRACT

A blower unit includes a case divided into an upper case portion having an air introduction port, a lower case portion for accommodating a fan, and a bell-mouth portion interposed between the upper and lower case portion portions. An air leading port is provided in the bell-mouth portion, so that air sucked from the air introduction port is introduced to the fan through the air leading port. An attachment boss portion onto which a motor is attached is formed to protrude from an outer wall surface of the upper case portion. Air blown by the fan flows through a duct which is divided into a first member integrated with the bell mouth portion and a second member integrated with the lower case portion. The first member extends from the bell mouth portion obliquely to cover the attachment portion, and the second member extends from the lower case portion in the same direction as the first member to be engaged with the first member. Thus, each of the upper case portion, the bell-mouth portion integrated with the first member and the lower case portion integrated with the second member is simply molded from resin by using a die.

14 Claims, 4 Drawing Sheets

CASE ASSEMBLING STRUCTURE OF BLOWER UNIT

CROSS-REFERENCE TO RELATED APPLICATION

This application is related to and claims priority from Japanese Patent Application No. Hei. 10-192617 filed on Jul. 8, 1998, the contents of which are hereby incorporated by reference.

BACKGROUND OF THE INVENTION

1. Field of the Invention

The present invention generally relates to a blower unit for a vehicle air conditioner. More particularly, the present invention relates to a case assembling structure for securing a bell-mouth portion between upper and lower case portions of a blower unit.

2. Description of Related Art

In a conventional blower unit, a bell-mouth portion is interposed between an upper case portion for introducing air and a lower case portion for blowing air, and both of the upper and lower case portions are fastened by using a screw member, so that a case assembling structure of the upper and lower case portions is made simple. Each of the upper and lower case portions is made of resin. An air introduction port for introducing air is provided in the upper case portion, and a door for opening and closing the air introduction port is accommodated within the upper case portion. On the other hand, the lower case portion forms therein an air-blowing passage, and a fan is accommodated within the lower case portion. Further, an air leading port through which air is introduced from the upper case portion to the fan within the lower case portion is provided in the bell-mouth portion. However, in the conventional blower unit, when a case portion for the blower unit is molded from a die, the case portion is not readily removable from the die, and each case portion must be divided into plural complex parts to enable removal from the die.

SUMMARY OF THE INVENTION

The inventors of the present invention experimentally produce a case of a blower unit shown in FIGS. 4A, 4B, 4C. The case includes an upper case portion 101, a lower case portion 102, and a bell-mouth portion 103. When the upper case portion 101, the lower case portion 102 and the bell-mouth portion 103 are assembled, a first member D1 integrated with the upper case portion 101 and a second member D2 integrated with the lower case portion 102 are connected to form a duct D. The upper and lower case portions 101, 102 and the first and second members D1, D2 are fastened by screwing members screwed into holes 5–8. The bell-mouth portion 103 is inserted and held between the upper and lower case portions 101, 102 by fastening pressure of the screwing members.

A door for opening and closing an air introduction port 10 is accommodated in the upper case portion 101, and an attachment boss portion 13 for attaching a motor for driving the door is provided on an outer wall surface of the upper case portion 101 to protrude from the outer wall surface of the upper case portion 101. The attachment boss portion is disposed at a position to be covered by the first member D1 of the duct D, as shown in FIG. 4A. Therefore, when the upper case portion 101 is molded from resin by using a die, it is difficult for the upper case portion 101 to be removed from the die after a resin molding. That is, because the first member D1 of the duct D and the attachment boss portion 13 are overlapped in the up-down direction, the first member D1 or the attachment boss portion 13 is caught by the die even when the upper case portion 101 is divided into two division parts in an up-down direction. Thus, it is necessary to divide the upper case portion 101 into plural complex division parts so that each division part is removed from a die during a resin molding.

In view of the foregoing problems, it is an object of the present invention to provide a blower unit having first and second case portions and a bell-mouth portion interposed between the first and second case portions each of which is readily removed from a die after a resin molding.

According to the present invention, a case of a blower unit includes a first case having an air introduction port for introducing air, a second case portion for accommodating a fan, a bell-mouth portion interposed between the first and second case portions, and an attachment boss portion protruding from an outer wall surface of the first case portion. A duct for forming an air passage through which air blown by the fan flows is integrated with the case of the blower unit. The duct is divided into a first member extending from the bell-mouth portion to cover the attachment boss portion when the first case portion and the bell-mouth portion are assembled, and a second member integrated with the second case portion. Further, the first member and second member are detachably assembled to form the duct. Thus, the attachment boss portion integrated with the first case portion is not overlapped with the duct, and each of the upper case portion, the bell-mouth portion integrated with the first member of the duct and the second case portion integrated with the second member of the duct can be readily removed in one way from a die after a resin molding. As a result, the case can be simply resin-molded in low cost.

Preferably, the bell-mouth portion is assembled between said first case portion and said second case portion by fastening said first and second case portions. Therefore, the bell-mouth portion is fixed between the first and second case portions by only pressure due to the fastening of the first and second case portions. Thus, an assembling structure of the upper case portion, the bell-mouth portion and the lower case portion can be made simple.

More preferably, the first member and the second member are fastened by using a fastening member. Therefore, a case structure including the upper case portion, the bell-mouth portion, the lower case portion and the duct can be further tightly connected to each other.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PRESENTLY PREFERRED EMBODIMENT

A preferred embodiment of the present invention will be described hereinafter with reference to FIGS. 1–2C. In the embodiment, a blower unit 100 of the present invention is typically applied to a vehicle air conditioner. A case of the blower unit 100 can be divided into an upper case portion 1 shown in FIG. 2A, a bell-mouth portion 3 shown in FIG. 2B and a lower case portion 2 shown in FIG. 2C. In the vehicle air conditioner, the blower unit 100 is disposed at an upstream air side of an air conditioning unit for controlling a temperature of air to be blown into a passenger compartment of a vehicle.

Figure 1:
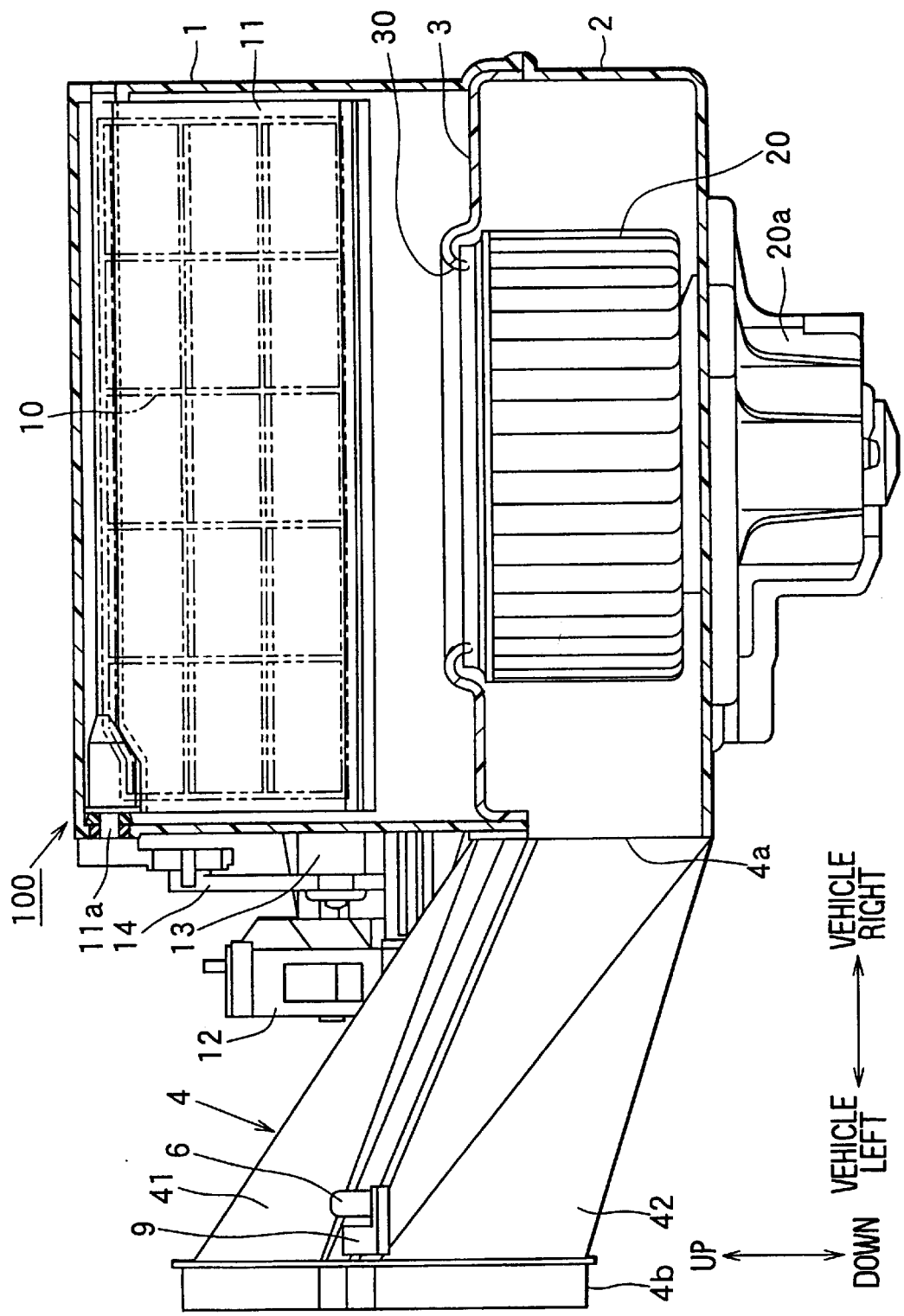
FIG. 1 is a partially sectional view showing a blower unit for a vehicle air conditioner according to a preferred embodiment of the present invention.

The blower unit 100 is disposed in the vehicle to correspond to the arrangement directions shown in FIG. 1. For example, in a vehicle having a left steering wheel, the air conditioning unit is disposed at an approximate center of an instrument panel in a vehicle right-left direction, and the blower unit 100 is disposed to be shifted from the air conditioning unit toward a right side in the vehicle right-left direction. The blower unit 100 is fixed to the instrument panel by using a fastening member (not shown).

The upper case portion 1 is used as an inside/outside air switching box for introducing inside air (i.e., air inside the passenger compartment) and outside air (i.e., air outside the passenger compartment). A fan 20 is accommodated in the lower case portion 2. The lower case portion 2 forms an air leading portion through which air sucked from the upper case portion 1 is introduced into the air conditioning unit. The bell-mouth portion 3 has an air leading port 30 through which air is introduced from the upper case portion 1 to the fan 20 disposed within the lower case portion 2. In FIG. 1, a duct 4 and the other members disposed outside the upper and lower case portion portions 1, 2 are indicated with outer shapes.

The upper case portion 1 has an inside air introduction port 10 for introducing inside air, and an outside air introduction port (not shown) for introducing outside air. The outside air introduction port is provided on an upper wall surface of the upper case portion 1. An inside/outside air switching door 11 for opening and closing the inside air introduction port 10 and the outside air introduction port is disposed within the upper case portion 1. FIG. 1 shows a state where the inside/outside air switching door 11 closes the inside air introduction port 10.

An attachment boss portion 13 is formed integrally with the upper case portion 1 to protrude from an outer wall surface of the upper case portion 1. A servomotor 12 is detachably attached to the attachment boss portion 13. The servomotor 12 is coupled to a rotation shaft 11a of the inside/outside air switching door 11 through a crank shaft 14, so that the inside/outside air switching door 11 selectively opens and closes the inside air introduction port 10 and the outside air introduction port.

Instead of the servomotor 12, a step motor may be used for rotating the inside/outside air switching door 11. In this case, the attachment boss portion 13 may be formed into a shape so that the step motor is readily attached to the attachment boss portion 13 in one step. Further, as shown in FIG. 2A, an attachment portion 15 is formed integrally with the upper case portion 1 at an upper side, and the blower unit 100 is attached to the instrument panel of the vehicle by the attachment portion 15.

The fan 20 accommodated in the lower case portion 2 is a centrifugal multi-blades fan, and is connected to a motor 20a disposed on a lower outer side of the lower case portion 2. The fan 20 is rotatably driven by the motor 20a. When the fan 20 is installed in the lower case portion 2, the motor 20a protrudes from the lower case portion 2 toward a lower outer side. The fan 20 has an approximate circular shape when viewed from an upper side in FIG. 1. The fan 20 sucks air from an upper side, and discharges the sucked air radially outwardly.

The bell-mouth portion 3 forming the air leading port 30 is interposed between the upper and lower case portion portions 1, 2, so that air from the upper case portion 1 is introduced to the fan 20 through the air leading port 30. The air leading port 30 is an opening approximately having a circular shape. The bell-mouth portion 3 partitions the upper and lower case portion 1, 2, except for a portion where the air leading portion 30 is provided. The upper and lower case portion portions 1, 2 are fastened, so that an outer peripheral portion of the bell-mouth portion 3 is held between the upper and lower case portion portions 1, 2.

The duct 4 is formed at a lower side of the blower unit 100 so that air blown by the fan 20 is introduced from the lower case portion 2 into the air conditioning unit through the duct 4. The duct 4 has a first end portion 4a through which an inner space of the duct 4 communicates with the lower case portion 2, and a second end portion 4b which can be detachably connected to the air conditioning unit.

The duct 4 is divided into a first member 41 integrated with the bell-mouth portion 3, and a second member 42 integrated with the lower case portion 2. The first member 41 and the second member 42 are detachably assembled to form the duct 4. As shown in FIG. 1, the first member 41 of the duct 4 extends from the bell-mouth portion 3 obliquely upwardly to cover the attachment boss portion 13. The second member 42 of the duct 4 extends from the lower case portion 2 in the same direction as the first member 41 so that a division portion of the second member 42 is engaged with a division portion of the first member 41.

Each of the upper case portion 1, the lower case portion 2 integrated with the second member 42 and the bell-mouth portion 3 integrated with the first member 41 is made of resin having an elasticity, such as polypropylene (PP) resin and acrylonitrile-butadiene-styrene resin (ABS resin). For example, each of the upper case portion 1, the lower case portion 2 integrated with the second member 42 and the bell-mouth portion 3 integrated with the first member 41 is formed by a resin molding method using a die which can be separated into two parts in the up-down direction. That is, resin is poured into the die, and a molded member is removed from the die by separating the die into the two parts.

Figure 2A:
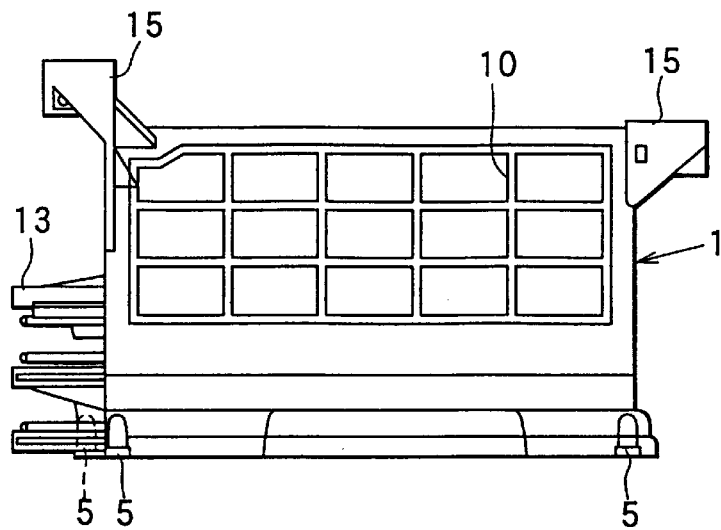
FIGS. 2A, 2B, 2C are disassemble views showing an upper case portion, a bell-mouth portion and a lower case portion, respectively, according to the embodiment.
Figure 2B:
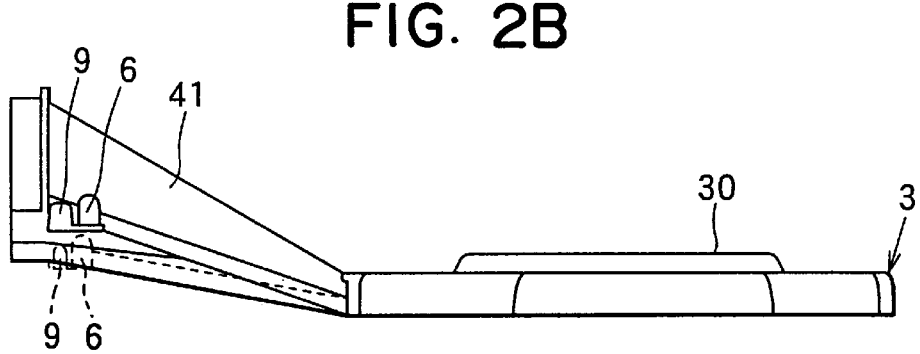
Figure 2C:
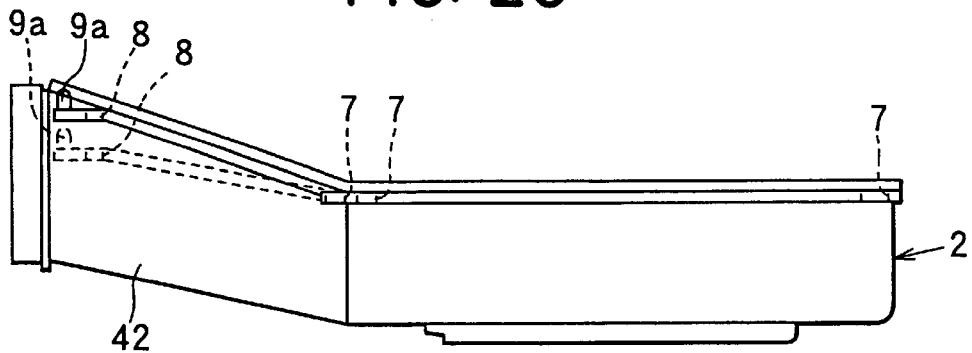

The upper case portion 1, the bell-mouth portion 3 integrated with the first member 41, and the lower case portion 2 integrated with the second member 42 are disposed as shown in FIGS. 2A, 2B, 2C, and are assembled and fastened by screw members, so that the case of the blower unit 100 is formed. As shown in FIG. 2A, plural screw holes 5 are provided in the upper case portion 1 by twisting off an outer wall of the upper case portion 1, and plural screw holes 6 are provided in the first member 41 of the duct 4 by twisting off an outer wall of the first member 41.

Further, through holes 7, 8 each of which has a diameter smaller than that of the head of a screw are provided in the lower case portion 2 and the second member 42 of the duct 4 at positions corresponding to the screw holes 5, 6, respectively. After the bell-mouth member 3 is interposed between the upper and lower case portion portions 1, 2, screws are screwed into the through holes 7 and the screw holes 5 corresponding to each other, respectively. Further, screws are screwed into the through holes 8 and the screw holes 6 corresponding to each other, respectively.

Guide holes 9 for setting an assembling position are provided in the first member 41, and guide pins 9a corresponding to the guide holes 9 are formed in the second member 42. When the upper case portion 1, the bell-mouth portion 2 and the lower case portion 3 are assembled, the guide pins 9a are inserted into the guide holes 9 so that assembling positions are readily determined. That is, after components such as the door 11 and the fan 20 are accommodated, the upper and lower case portions 1, 2 and the first and second members 41, 42 of the duct 4 are fastened so that the blower unit 100 is assembled. Thereafter, the second end portion 4b of the duct 4 is connected to the air conditioning unit, so that the air conditioner is assembled.

Next, operation of the blower unit 100 will now be described. When the fan 20 operates, air introduced from an air introduction port selected by the inside/outside air switching door 11 passes through the air leading port 30 of the bell-mouth portion 3, and flows into the lower case portion 2 from an upper side of the fan 20. Thereafter, air is blown radially outwardly by the fan 20, and is introduced into the air conditioner through the duct 4.

The air conditioner connected to the second end portion 4b of the duct 4 includes an evaporator (i.e., cooling heat exchanger) and a heater core (i.e., heating heat exchanger). Therefore, air blown by the blower unit 100 is cooled in the evaporator, and is heated in the heater core to have a predetermined temperature. Conditioned air is blown toward predetermined positions in the passenger compartment from outlets provided at most downstream air sides of the air conditioner.

According to the embodiment of the present invention, the first member 41 of the duct 4 is integrally formed with the bell-mouth portion 3. That is, because the first member 41 is not overlapped with the attachment boss portion 13, the upper case portion 2 can be removed from a die in one way after being resin-molded. Further, each of the bell-mouth portion 3 integrated with the first member 41 of the duct 4 and the lower case portion 2 integrated with the second member 42 of the duct 4 does not have an overlapped portion, and can be readily removed from a die in one way after being resin-molded. Thus, each case portion for forming the case of the blower unit 100 can be molded from a die which can be divided into two parts in the up-down direction, thereby reducing product cost of the die.

The first member 41 and the second member 42 can be fixed by only pressure due to fastening of the upper and lower case portion portions 1, 2. However, according to the embodiment of the present invention, because the first and second members 41, 42 of the duct 4 are fastened, the first and second members 41, 42 of the duct 4 can be further tightly fixed.

According to the embodiment of the present invention, the duct 4 is formed only by connecting the bell-mouth portion 3 and the lower case portion 2. Therefore, only the upper case portion 1 can be removed while the duct 4 is connected to the air conditioning unit. Thus, a filter disposed in the upper case portion 1 for cleaning air or the servomotor can be readily changed by only removing the upper case portion 1.

Further, according to the embodiment of the present invention, the bell-mouth portion 3 is assembled between the upper and lower case portion portions 1, 2 by only fastening pressure of the upper and lower case portion portions 1, 2. Therefore, the number of the attachment portions of the upper and lower case portion portions 1, 2 and the bell-mouth portion 3 can be reduced. Thus, the case assembling structure of the blower unit 100 can be made simple.

Although the present invention has been fully described in connection with the preferred embodiment thereof with reference to the accompanying drawings, it is to be noted that various changes and modifications will become apparent to those skilled in the art.

Figure 3A:
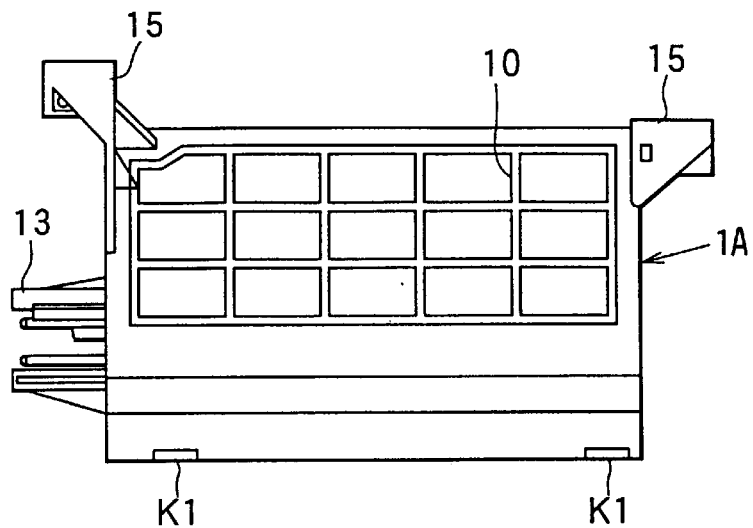
FIGS. 3A, 3B, 3C are disassemble views, showing an upper case portion, a bell-mouth portion and a lower case portion, respectively, according to a modification of the present invention.
Figure 3B:
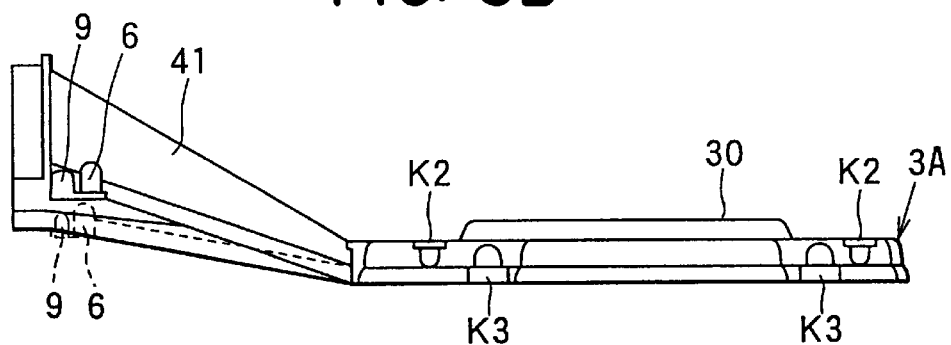
Figure 3C:
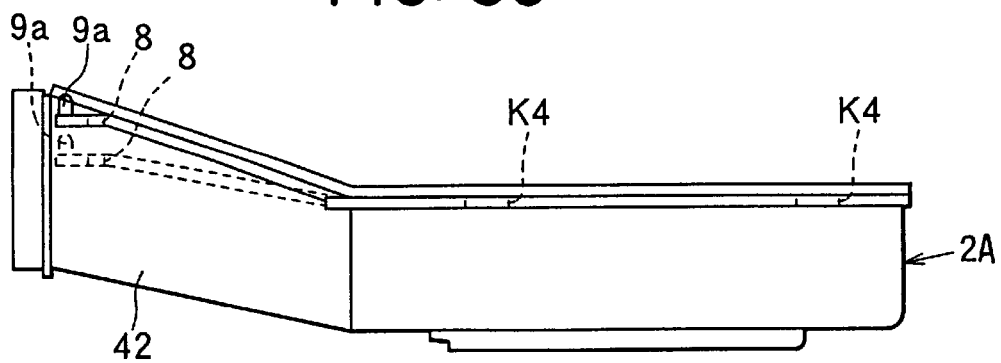
Figure 4A:
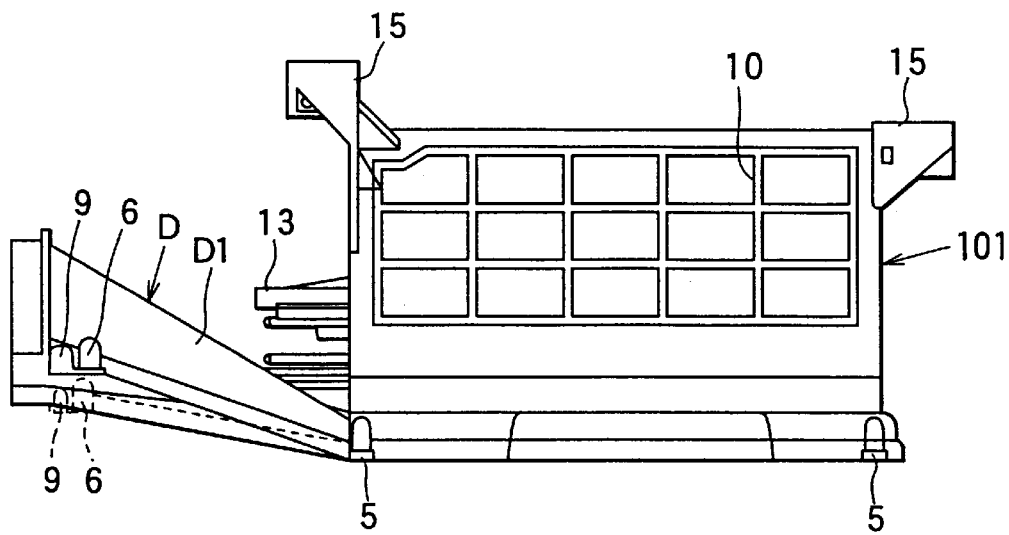
FIGS. 4A, 4B, 4C are disassemble views showing an upper case portion, a bell-mouth portion and a lower case portion, respectively, which are experimentally produced.
Figure 4B:
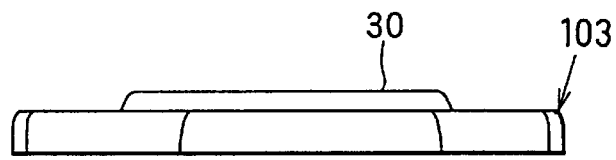
Figure 4C:
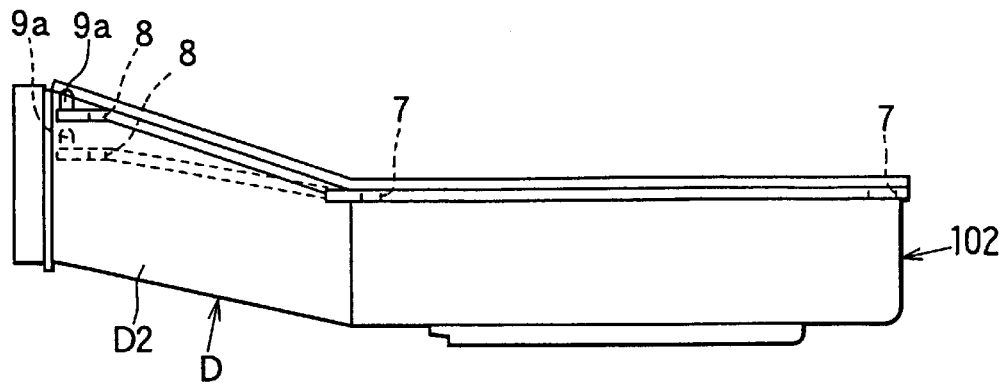

For example, the present invention may be applied to a case of a blower unit, where an upper case portion 1A, a bell-mouth portion 3A and a lower case portion 2A are respectively connected by screw members, as shown in FIGS. 3A, 3B, 3C. Here, each case portion for forming the case of the blower unit can be molded from a die which is divided into two parts in the up-down direction. However, it is compared with the blower unit 100 of the above-described embodiment, the assembling step for assembling the upper case portion 1A, the bell-mouth portion 3A and the lower case portion 2A becomes complex. That is, As shown in FIGS. 3A, 3B, 3C, screw holes K1, K2 are provided in the upper case portion 1A and the bell-mouth portion 3A, respectively, and screw members are screwed into the screw holes K1, K2 so that the upper case portion 1A and the bell-mouth portion 3A are connected. Further, screw holes K3, K4 are provided in the bell-mouth portion 3A and the lower case portion 2A, respectively, and screw members are screwed into the screw holes K3, K4 so that the bell-mouth portion 3A and the lower case portion 2A are connected. In the modification of the present invention, the other portions of the blower unit are similar to those in the above-described embodiment, and the explanation thereof is omitted.

Further, the present invention may be applied to an any blower unit where components such as the inside/outside air switching door 11 and the fan 20 disposed in the case are arbitrarily changed.

Such changes and modifications are to be understood as being within the scope of the present invention as defined by the appended claims.

What is claimed is:
1. A blower unit for a vehicle air conditioner, said blower unit comprising:
   a case made of resin and having an air introduction port through which air is introduced therein;
   a door disposed in the case, for opening and closing said air introduction port;
   a motor for driving said door;
   a fan disposed in the case, for blowing air introduced from said air introduction port; and
   a duct for forming an air passage through which air blown by said fan flows, wherein:
   said case includes
      a first case portion having said air introduction port and accommodating said door,
      a second case portion for accommodating said fan,
      a bell-mouth portion having an air leading port through which air from said first case portion is introduced to said fan, and
      an attachment boss portion protruding from an outer wall surface of said first case portion, onto which said motor is attached;
   said duct is divided into a first member extending from said bell-mouth portion to cover said attachment boss portion when said first case portion and said bell-mouth portion are assembled, and a second member integrated with said second case portion; and said first member and said second member are detachably assembled to form said duct.

2. The blower unit according to claim 1, wherein said bell-mouth portion is assembled between said first and second case portions by fastening said first and second case portions.

3. The blower unit according to claim 2, further comprising:

fastening means for fastening said first member and said second member, wherein said first member and said second member are fastened by using said fastening means.

4. The blower unit according to claim 1, wherein said second member extends from said second case portion in a direction corresponding to said first member.

5. The blower unit according to claim 4, wherein:

said first case portion is disposed on an upper side of said bell-mouth portion;

said attachment boss portion extends approximately horizontally from said first case portion;

said second case portion is disposed on a lower side of said bell-mouth portion; and said first member of said duct extends from said bell-mouth portion obliquely upwardly.

6. The blower unit according to claim 1, wherein each of said first case portion, said bell-mouth portion integrated with said first member of said duct and said second case portion integrated with said second member of said duct is resin-molded by using a die which is divided into two parts in an up-down direction.

7. The blower unit according to claim 1, wherein said fan is a centrifugal type fan.

8. A method for manufacturing a case for a blower unit having a duct integrated with said case, said duct being divided into a first member and a second member, said method comprising step of:

molding a first case portion having an air introduction port for introducing air and an attachment protrusion protruding from an outer wall surface of said first case portion, from resin by using a die which is divided into two parts in an up-down direction;

integrally molding a bell-mouth portion having an air leading port and said first member integrated with said bell-mouth portion, from resin by using a die which is divided into two parts in the up-down direction;

integrally molding a second case portion for accommodating a fan and said second member integrated with said second case portion, from resin by using a die which is divided into two parts in the up-down direction;

fastening said first case portion and said second case portion after said bell-mouth portion is interposed between said first and second case portions; and assembling said first member and said second member to form said duct integrated with said case.

9. The method according to claim 8, wherein said molding steps are performed in an arbitrary order.

10. The method according to claim 8, wherein said first member and said second member are assembled by fastening said first member and said second member during said assembling step.

11. The method according to claim 8, wherein:

said first member is formed during said molding step to extend from said bell-mouth portion obliquely toward said first case portion to cover said attachment protrusion when said first case portion and said bell-mouth portion are assembled; and said second member is formed during said molding step to extend from said second case portion to be engaged with said first member.

12. The blower unit according to claim 1, wherein said first member protrudes from said bell-mouth portion to the same side as said attachment boss portion.

13. The blower unit according to claim 1, wherein said first member and said bell-mouth portion are an integrally molded member.

14. The blower unit according to claim 13, wherein said second member and said second case portion are an integrally molded member.

\* \* \* \* \*